United States Patent Office.

JOHN ZENGELER, OF CHICAGO, ILLINOIS.

Letters Patent No. 90,417, dated May 25, 1869.

---

IMPROVED INK-POWDER AND DYE FROM ANILINE COLORS.

---

The Schedule referred to in these Letters Patent and making part of the same.

---

*To all whom it may concern:*

Be it known that I, JOHN ZENGELER, of the city of Chicago, in the county of Cook, and State of Illinois, have discovered a new and valuable Preparation for Producing a Black Ink, Dye, Coloration, or Stain; and do hereby declare that the following is a full and exact description thereof.

The nature of my invention consists in the use of dextrine, British gum, roasted starch, gum-arabic, or any other soluble gum or mucilaginous substance, in combination with a mixture of aniline, or any of its salts or compounds, with oxidizing-agents of any kind, such, for instance, as chlorate or bichromate of potassa, or sulphate, acetate, or chloride of copper, &c., whereby I produce a compound, in the form of a dry powder, so constituted as to retain its useful properties unimpaired by age, and of such a nature as to produce a black, indelible stain or dye, irremovable by acids or alkalies, when the said compound is mixed or diluted with water, and applied to absorbent or adherent substances or surfaces.

The usefulness and advantage of my invention consist in the fact that all other preparations for producing an aniline black are more expensive and complicated, require great skill and experience to bring them into a condition suitable for use, and when in that condition, they are in the form of very dilute and bulky liquids, which cannot be kept in store, or transported to a distance, without undergoing rapid deterioration and loss of useful properties.

My preparation, on the contrary, has the following advantages:

It is comparatively inexpensive.

It contains the coloring-matter in a highly-concentrated form.

It is in the form of a dry powder.

It undergoes no deterioration or loss of properties by keeping.

It requires no skill or experience in its management, it being only necessary to add more or less water, according to the application intended.

It is peculiarly adapted for writing, marking, printing, and dyeing-purposes, owing to its remarkably permanent and indelible character, and to the mucilaginous quality imparted by the dextrine.

In its preparation, I mix together the following substances, in the proportions indicated, each substance having been previously and separately reduced to powder, and dried as perfectly as can be done, without injuring the properties of the same:

Dextrine, one hundred and twenty-eight parts.
Salt of aniline, thirty-two parts.
Sulphate of copper, fourteen parts.
Chlorate of potassa, eight parts.
Sal-ammoniac, thirty-two parts.
Bichromate of potassa, four parts.

In the first place, the dextrine is distributed among the other powders, in quantities proportioned to the amount of each, after which all of the powders are mixed together, and placed in vessels for use.

The above are the ingredients and the proportions which I prefer.

The proportions, however, can be greatly varied without detriment, and instead of dextrine, other equivalent substances can be used. In place of sulphate of copper, other copper-salts may be used, such as the nitrate, acetate, or chloride, &c., or other oxidizing-agents, may be substituted.

By this process, I produce an indelible ink or dye, by which animal, vegetable, and porous, adherent, or absorbent mineral substances can be stained or dyed in the most permanent and simple manner, so that the color, when once fixed on the material, cannot be removed, even by strong soap, alkaline or acid solutions.

When first applied, the color is greenish, changing, after several days, to a dark green, and finally to a black. The black can, however, be produced immediately, by applying heat, 100° Fahrenheit being sufficient.

When used as an ink-powder, a little of the material is dissolved in water, and the solution applied in the same manner as any common ink.

When used as a dye or stain, the mode of application is the same as that in ordinary use, for producing aniline black.

What I claim as new, and wish to secure by Letters Patent, is—

The preparation of an ink or dye-material, in the form of a dry powder, the same being prepared in the manner above described, or in any equivalent manner.

JOHN ZENGELER.

Witnesses:
C. F. CHILSAN,
G. A. MARINER.